No. 655,530. Patented Aug. 7, 1900.
M. VOSSBECK.
BREAD OR CAKE PAN.
(Application filed Apr. 23, 1900.)
(No Model.)
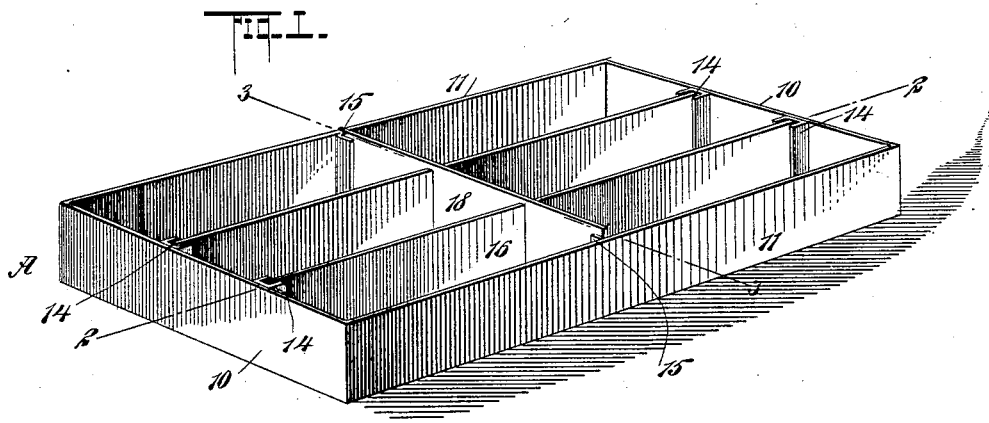
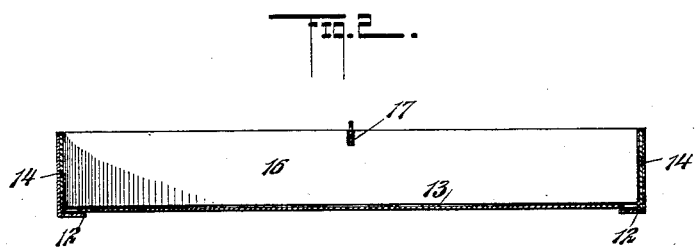
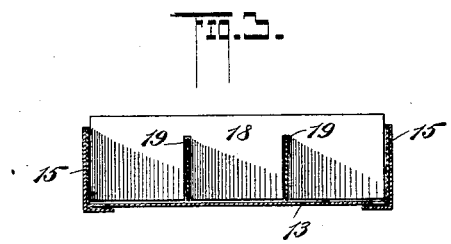
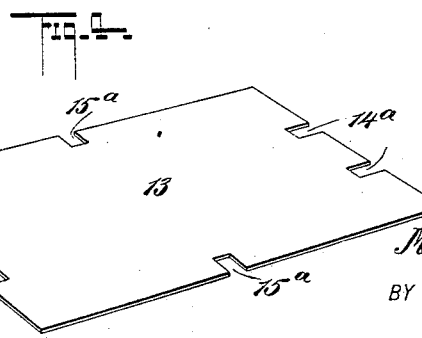
WITNESSES:
INVENTOR
Marie Vossbeck.
BY
ATTORNEYS

UNITED STATES PATENT OFFICE.

MARIE VOSSBECK, OF TRINIDAD, COLORADO.

BREAD OR CAKE PAN.

SPECIFICATION forming part of Letters Patent No. 655,530, dated August 7, 1900.

Application filed April 23, 1900. Serial No. 13,928. (No model.)

*To all whom it may concern:*

Be it known that I, MARIE VOSSBECK, a citizen of the United States, and a resident of Trinidad, in the county of Las Animas and State of Colorado, have invented a new and useful Improvement in Bread or Cake Pans, of which the following is a full, clear, and exact description.

The purpose of the invention is to provide a pan particularly adapted for baking bread and having separable parts, the pan being so made that all the floor or shelf space of an oven may be utilized at one time.

Another purpose of the invention is to so construct the pan that the various parts may be quickly and conveniently detached and buttered or greased and again put together, and, furthermore, to so construct the pan that when the loaves have been baked the body and bottom of the pan may be removed from engagement with the partitions, which partitions will serve to hold the baked loaves separate and yet permit them to rapidly cool.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved pan. Fig. 2 is a longitudinal section taken substantially on the line 2 2 of Fig. 1. Fig. 3 is a transverse section taken practically on the line 3 3 of Fig. 1, and Fig. 4 is a perspective view of the bottom of the pan.

The body A of the pan consists of end pieces 10 and side pieces 11, the said pieces being continuous or connected in any approved manner, and each end and side piece 10 and 11 of the body of the pan is provided with an inwardly-extending bottom flange 12, (shown best in Fig. 2,) which flange serves to receive and support the bottom 13 of the pan, which is loosely placed in the body. Upon the inner face of each end 10 of the body A slideways 14 are formed, and slideways 15 are likewise formed upon or attached to the inner faces of the sides 11 of the body. In the drawings two slideways 14 are illustrated at each end of the body and a single slideway 15 at each side of the body; but the number of slideways may be increased or a less number may be employed, as may be found desirable.

The end slideways 14 are adapted to receive the end portions of longitudinal partitions 16, and these partitions are provided between their ends with one or more slots 17, produced in their upper edges, in order that one or more transverse partitions 18 may be employed in connection with the longitudinal partitions 16. The transverse partitions 18 enter the slideways 15, and each transverse partition is provided with a lengthy transverse slot 19 in its under edge, which slots are adapted to receive the longitudinal partitions where the recesses 17 are made in the latter. Under this arrangement a series of compartments is provided, in each of which a portion of dough may be placed to form a proper size of loaf.

The bottom 13 is provided with recesses $14^a$ at its ends and with recesses $15^a$ at its sides in order that the bottom 13 may be readily placed in the body of the pan prior to placing the partitions in position, the recesses in the margin of the bottom 13 being adapted to receive the slideways 14 and 15, attached to the body A of the pan. When the bread has been baked, the pan may be inverted and the body of the pan, together with the bottom, removed from the partitions, and the loaves may then be left within the compartments on a suitable board or support, and the said compartments will be open to a greater or a less extent and will permit the loaves of bread to rapidly cool.

The pan constructed as above set forth is very economic and insures the loaves being of about equal size, and the pan may be made of such dimensions that it will extend from front to rear and from end to end of the oven, either at the bottom of the oven or the surface of a shelf within said oven, and bread and cake may be baked at the same time in the same pan.

Having thus described my invention, I claim as new and desire to secure by Letters Patent—

1. A pan comprising a frame consisting of end walls and side walls having on their inner faces spaced projections forming slideways between them, said walls being also provided with inturned flanges at the bottom, a bottom adapted to rest on said flanges and provided with notches arranged to receive said projections, and intersecting partitions constructed to fit into said slideways, the partitions being slotted and loosely engaged with each other.

2. A pan comprising a frame consisting of end walls and side walls having on their inner faces spaced projections forming slideways between them, a bottom arranged to fit between said end walls and side walls and provided with notches arranged to receive said projections, and intersecting partitions constructed to fit into said slideways.

In testimony whereof I have signed my name to this specification in the presence of two subscribing witnesses.

MARIE VOSSBECK.

Witnesses:
HANS VOSSBECK,
WM. LITTLEFIELD.